(12) United States Patent
Swanson et al.

(10) Patent No.: US 6,259,454 B1
(45) Date of Patent: *Jul. 10, 2001

(54) METHOD AND APPARATUS FOR INTERPOLATIVE, ADAPTIVE ILLUMINATION IN 3D GRAPHICS

(75) Inventors: Roger Swanson; Daniel Hung, both of Santa Clara; John W. Brothers, Palo Alto, all of CA (US)

(73) Assignee: S3 Graphics Co., Ltd., Grand Cayman (KY)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/132,566

(22) Filed: Aug. 11, 1998

(51) Int. Cl.[7] .................................................... G06T 15/60
(52) U.S. Cl. ................................................................ 345/426
(58) Field of Search ................................... 345/426, 421, 345/418

(56) References Cited

U.S. PATENT DOCUMENTS

| | | |
|---|---|---|
| 5,253,339 | 10/1993 | Wells et al. . |
| 5,381,519 * | 1/1995 | Brown et al. ......................... 345/432 |
| 5,649,078 * | 7/1997 | Gerth et al. ........................... 345/422 |
| 5,659,671 | 8/1997 | Tannenbaum et al. . |
| 5,729,672 * | 3/1998 | Ashton ................................. 345/426 |

OTHER PUBLICATIONS

Van Overveld, C. W. (Phong Normal Interpolation Revisited, ACM Transanctions on Graphics, vol. 16, No. 4, Oct. 1997, pp. 397–419).*

* cited by examiner

Primary Examiner—Mark Zimmerman
Assistant Examiner—Huedung X. Cao
(74) Attorney, Agent, or Firm—Carr & Ferrell LLP

(57) ABSTRACT

A method of providing specular highlights to 3D graphics using Phong illumination calculations spaces the pixels subject to the calculations apart in direct relationship to the number of lights contributing to the highlights. Linear, quadratic, or cubic attenuation is then applied to interpolate the values for the pixels not subject to the calculations.

20 Claims, 4 Drawing Sheets

METHOD AND APPARATUS FOR INTERPOLATIVE, ADAPTIVE ILLUMINATION IN 3D GRAPHICS

TECHNICAL FIELD

The present invention relates generally to computer graphics shading illumination and more specifically Phong shading/illumination of three-dimensional (3D) objects in computer graphics.

BACKGROUND ART

In the rendering of three-dimensional graphics for computer systems, the curved surfaces of objects are generally represented as a wire-frame of planar polygons. In high-speed graphics, the polygons are often simple triangles where each triangle has three vertices and each vertex has attributes of position, normal, and color. The vertex position is defined, for example, in the object coordinate space. The vertex normals are unit vectors which describe the surface orientation at each vertex. The vertex color provides the color of the object.

In order to generate a realistic image of an object, such as a billiard ball, not only must the triangles form the roughly spherical shape, but they must also include the shading of the surfaces. This requires taking into account the illumination and a combination of three reflection functions which are ambient, diffuse, and specular reflections.

Ambient reflection provides the billiard ball's color due to indirect reflection of light from the surrounding environment. Diffuse reflections are reflections from surfaces in which light is scattered equally in all directions. Specular reflection is the highlight due to shiny surfaces such as the reflection of a light on the billiard ball.

To provide realistic highlights, a number of different illumination techniques have been developed and one of the most preferred is Phong shading. Bui-Tuong Phong developed the shading/illumination technique which bears his name. Phong, BT, "Illumination for Computer Generated Images", Ph.D. Dissertation, Department of Computer Science, University of Utah, Salt Lake City, Gov. ordering No. AD-A0008-786 (July 1973)). The Phong illumination model modulates specular reflection as a function of the cosine of the angle between the vector to the viewing point and the vector which aligns with the maximum reflection.

Where there are a number of light sources which affect the specular reflection, the amount of reflection is additive. Effectively, this means if a number of different light sources shine off a surface, the reflection is the sum of the reflection due to each light source.

Currently, there are two approaches to using Phong illumination calculations. The first is a vertices-based technique in which a Phong illumination computation is done for each light at each vertex of the triangles which make up the object. This technique was an attempt to develop real-time realism for relatively inexpensive computer game computers. The reflections are summed and then blended across the surface of the object. This can be done relatively quickly and does not require a lot of hardware for the generation of the image. Unfortunately, the results, especially in cases with specular highlights, are relatively poor. One visual difficulty observed is that in cases where specular highlights should not move, such as highlight on a rotating billiard ball, highlights tend to move, following the edges of the polygons.

The other approach involves a pixel/subpixel technique. The Phong illumination computation is done for each light at each pixel/subpixel element of the object. This eliminates the problems with specular highlights and produces much more realistic highlights than the vertices-based technique. However, as there are a large number of pixels per triangle, this technique is very costly since Phong illumination computations (an expensive computation process) are done at each pixel/subpixel for the object.

The cost of using Phong illumination computations is evident when it is understood that the hardware must solve an equation which requires the solution of 7 additions, 6 multiplications, 1 division, and 1 square root calculation per pixel per light per color component. The calculation is very expensive and time-consuming, especially because it includes the square root calculation. Each Phong calculation, at three colors per pixel according to the OpenGL (Graphic Language) standard which requires at least 8 lights, requires 115 additions, 72 subtractions, 171 multiplications, 8 divisions, 16 exponentials, 8 absolute values, 24 maximum values, 24 dot products, and 24 unit vector the Phong calculation could have to be performed some 780,000 times. Furthermore, if objects should overlap, multiple Phong computations may be necessary. Further, for realism in animation, the human eye notices refreshment of the screen if it is slower than 30 frames per second, so all of these computations must be performed faster than 30 times a second.

Phong illumination is an extremely realistic modeling of lighting conditions for graphic images, but it is incredibly expensive in terms of computational hardware and computation time.

The long sought goal has been to achieve the quality of Phong illumination at a speed suitable for animation and video games at a reasonable consumer price.

A further goal has been to reduce the per pixel cost while increasing visual qualities over the vertices-only approach. Various approaches have been attempted.

While Phong illumination has been long known, it has not come into popular use for real-time, high-definition systems at a reasonable consumer price because of the computation time required for each pixel. Thus, although there have been a number of attempts to eliminate the problems with specular highlights and produce graphics with Phong illumination computations being used which are better than the vertices-based technique, a solution has long eluded those skilled in the art.

DISCLOSURE OF THE INVENTION

The present invention provides a method of doing the Phong illumination computation on less than all the pixels and then interpolating the results of the computation across the pixels in between. At the same time, the number of Phong illumination computations performed is adjusted or adapted based on the scene being rendered.

The present invention provides a Phong illumination computation system in which the 3D graphics are of an improved highlighting over that of vertices-based techniques.

The present invention also provides a Phong illumination system where the cost per pixel is less than that of Phong pixel/subpixel-based technique.

The above and additional advantages of the present invention will become apparent to those skilled in the art from a reading of the following detailed description when taken in conjunction with the accompanying drawings.

BEST MODES FOR CARRYING OUT THE INVENTION

Figure 1:
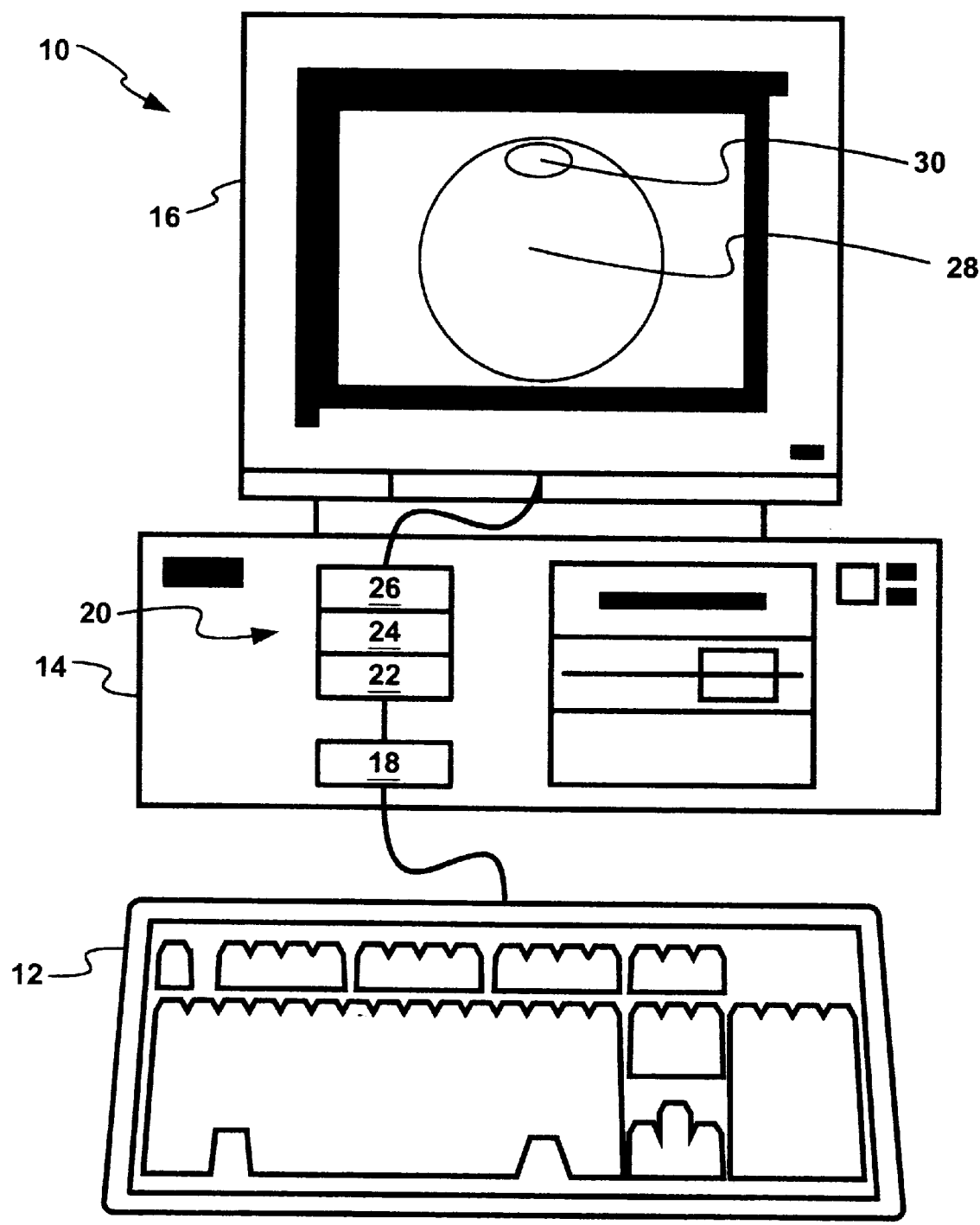
FIG. 1 is a schematic of a computer graphics system incorporating the present invention showing an object on its output display.

Referring now to FIG. 1, therein is shown a computer graphics system 10 consisting of an input keyboard 12, a computer 14, and an output display 16.

The computer 14 contains all the conventional components for operation of the system 10 including a central processing unit (CPU) 18. The CPU 18 is connected to a graphics system 20, which in turn is connected to the output display 16. The graphics system 20 contains a pixel selection mechanism 22, an illumination calculation mechanism 24, and an interpolation mechanism 26.

On the output display 16 is shown an object 28, which is spherical, like a billiard ball, and which has a spectral highlight 30 on top.

Figure 2:
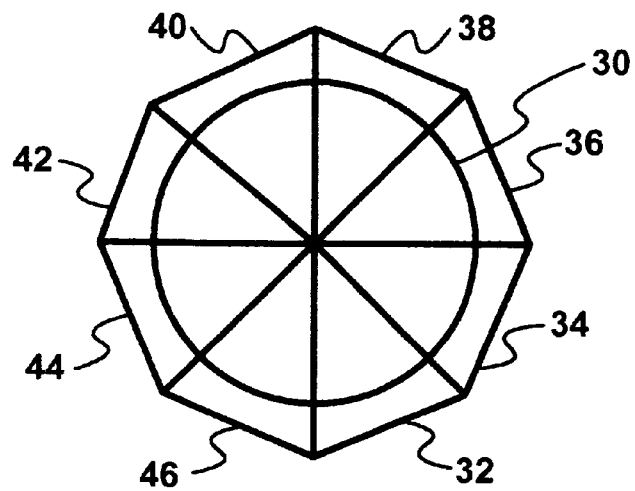
FIG. 2 is a partial top view of the object showing the wire frame polygons and a specular highlight.

Referring now to FIG. 2, therein is shown a partial top view of the object 28 showing a number of polygons which form the surface of the object 28. Specifically, the surface of the object 28 is made up of a plurality of triangles 32, 34, 36, 38, 40, 42, 44, and 46. The spectral highlight 30 is shown disposed within the triangles.

Figure 3:
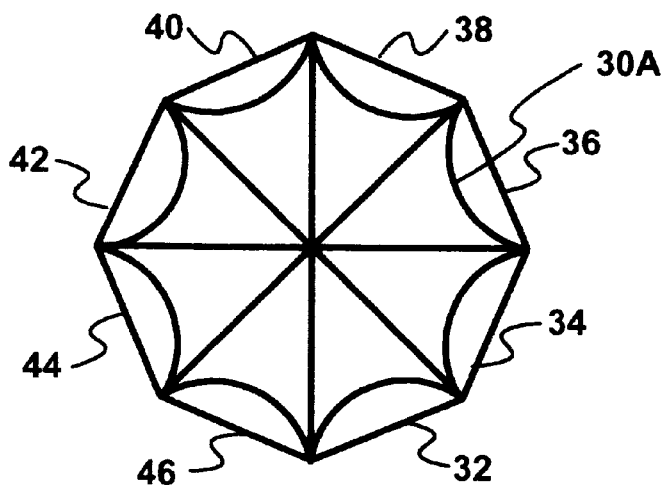
FIG. 3 PRIOR ART is a top view of the object showing a Prior Art specular highlight.

Referring now to FIG. 3 PRIOR ART, therein are shown the triangles 32, 34, 36, 38, 40, 42, 44, and 46 containing a spectral highlight 30A which is the appearance of the spectral highlight in the prior art using the vertices calculation technique.

Figure 4:
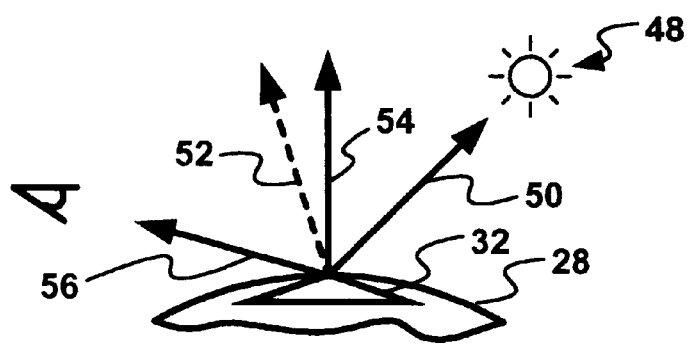
FIG. 4 is a top view of FIG. 2 showing the vector nomenclature for Phong illumination used in the present invention.

Referring now to FIG. 4, therein is shown a portion of the object 28 with one of the triangles 32. At the vertex of the triangle 32 are the various vectors used in the Phong illumination calculations as will hereinafter be explained. The vectors are designated by bold letters and change position with respect to a light source 48. The light source vector 50, $l$, is a vector extending from the vertex of the triangle 32 to the light source 48. A reflection vector 52, $s$, is the reflection of the light 48 based on the normal vector n, which is the normal to the surface of the object 28 at the vertex of the triangle 32. A viewpoint vector 56, $vp$, is the vector to the viewing point of the observer.

Figure 5:
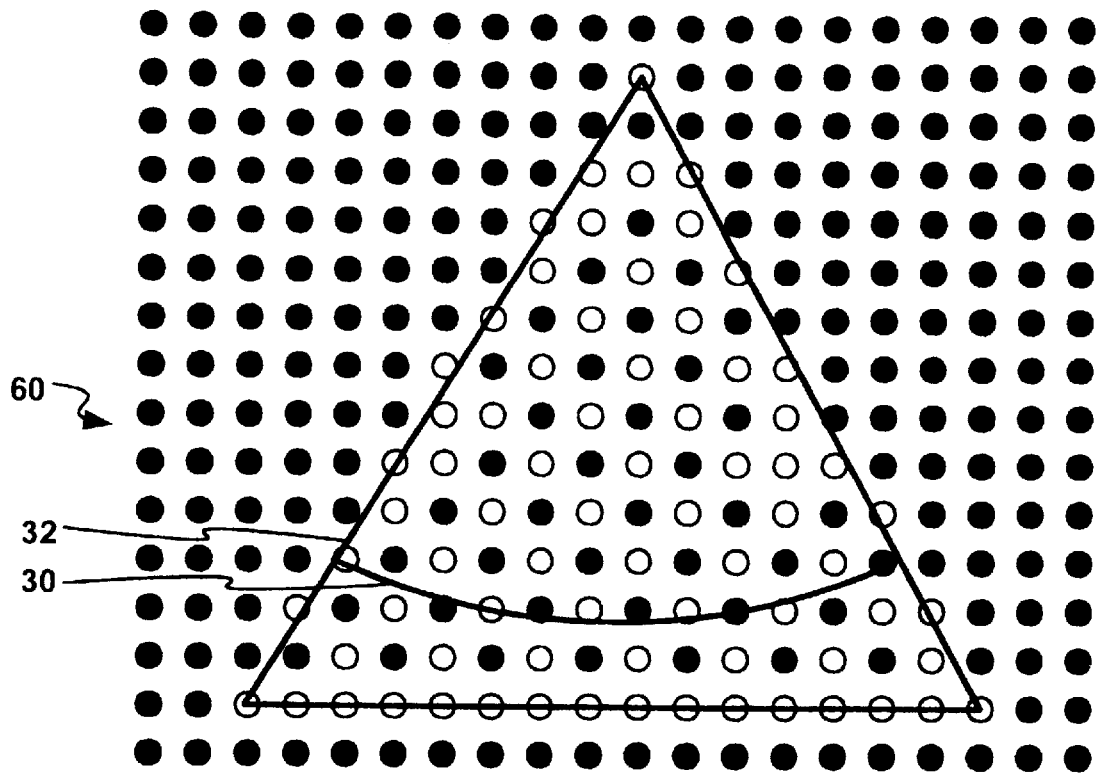
FIG. 5 is one of the polygons of FIG. 2 showing the pixels subject to Phong illumination calculations with two or more lights at a high degree of realism.

Referring now to FIG. 5, therein is shown the triangle 32 which would be formed by the plurality of pixels 60 on the output display 16. The pixels subject to the Phong illumination calculations are adjustable and are shown in white, while those which are not, are shown in black. In FIG. 5, the arrangement is shown with two or more lights to provide a high degree of realism. It should be understood that an operator may make adjustments to override the pixel selection to have the illumination calculation performed at every pixel to provide the highest degree of realism. The operator may also override the pixel selection to have the illumination calculations performed at even fewer pixels, so as to trade quality for speed.

Figure 6:
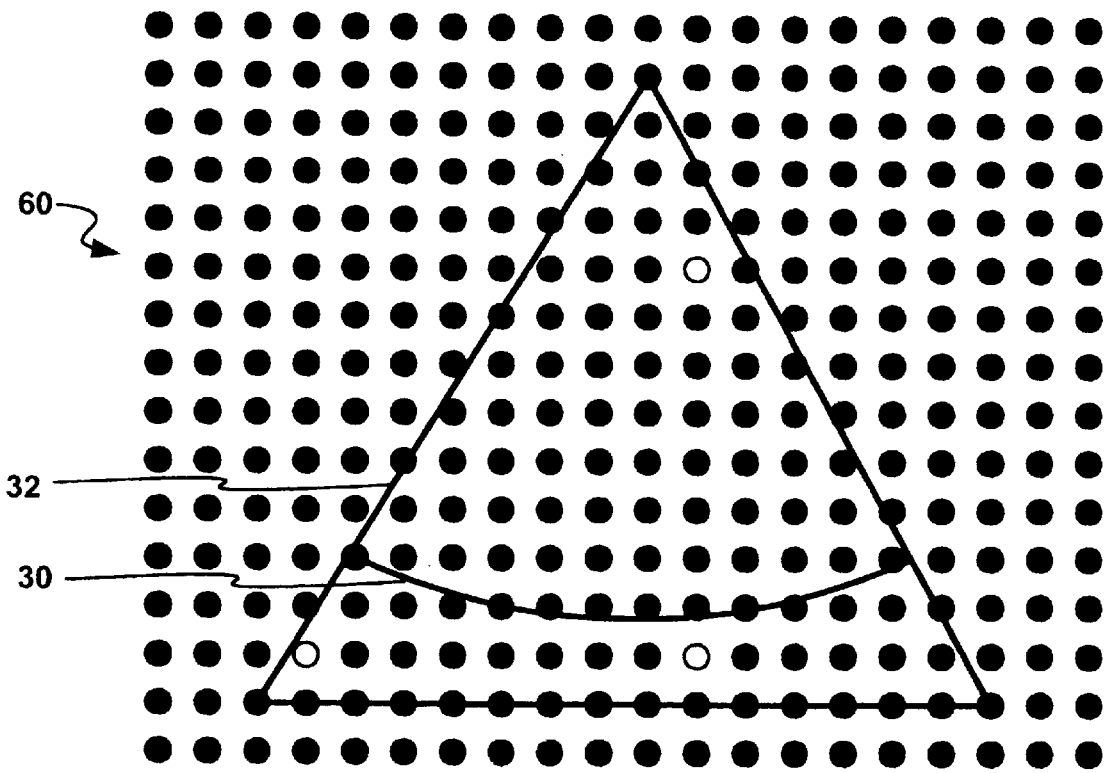
FIG. 6 shows one of the polygons of FIG. 2 showing the pixels subject to Phong illumination calculations by eight lights.

Referring now to FIG. 6, therein is shown the triangle 32 with the pixels subject to the illumination calculations for eight lights being shown in white.

Figure 7:
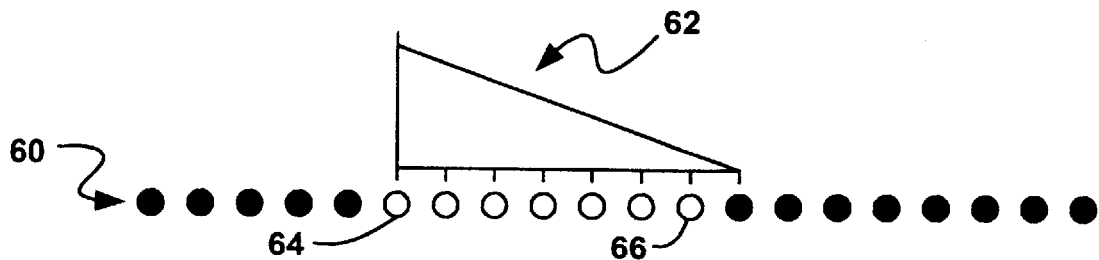
FIG. 7 shows a row of pixels having linear interpolation of the illumination between pixels.

Referring now to FIG. 7, therein is shown a row of pixels having linear interpolation of the illumination between pixels. The graph 62 shows how the illumination would be interpolated with the illumination calculation being performed at pixel 64 and being linearly diminished over seven pixels to pixel 66.

Figure 8:
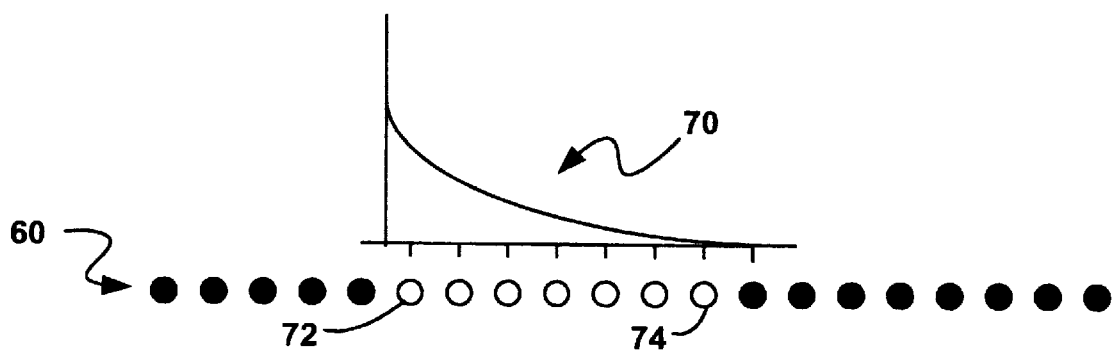
FIG. 8 shows a row of pixels having quadratic interpolation of the illumination between pixels.

Referring now to FIG. 8, therein is shown a row of pixels having quadratic interpolation of the illumination between pixels. The graph 70 shows how the illumination would be interpolated with the illumination calculation being performed at pixel 72 and being quadratically diminished over seven remaining pixels to pixel 74.

Figure 9:
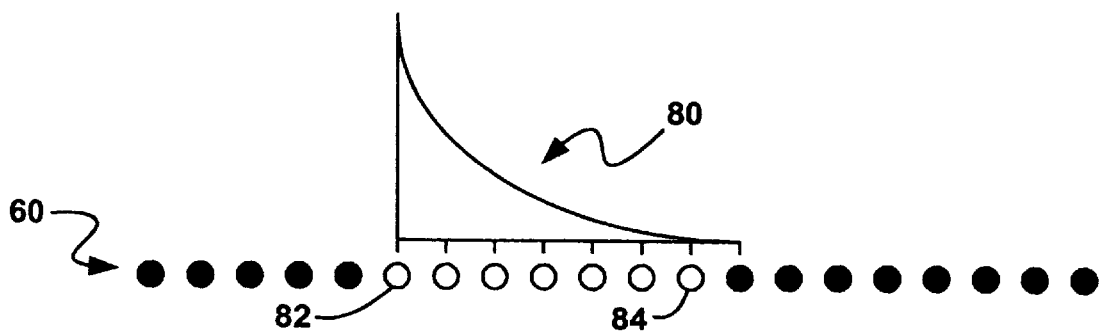
FIG. 9 shows a row of pixels having cubic interpolation of the illumination between pixels.

Referring now to FIG. 9, therein is shown a row of pixels having cubic interpolation of the illumination between pixels. The graph 80 shows how the illumination would be interpolated with the illumination calculation being performed at pixel 82 and being cubically diminished over seven pixels to pixel 84.

In operation the CPU 18 is provided with all the geometry data required to show a realistic-appearing object 28 on the output display 16. Among other information, there is data relating to the configuration or geometry of the object 28, its location in three-dimensional space, its material or texture, and the various lights illuminating it.

As would be evident to those skilled in the art, in rendering an object 28, which could be a billiard ball, certain lights would provide specular highlight 30. In such a situation as shown in FIG. 2 where the spherical surfaces rendered by a plurality of triangles 32, 34, 36, 38, 40, 42, 44, and 46, the ideal specular highlight 30 would be completely circular as viewed from the top. However, if the object 28 were to be a billiard ball which is started spinning about its vertical axis, the vertex Phong calculations would result in the sunburst configuration 30A as the specular highlight, as shown in FIG. 3 PRIOR ART. This configuration is extremely unrealistic and, therefore, highly undesirable.

The starting point of the present invention is the overall lighting equation:

$$\text{PixelColor} = \text{Emission}_{\text{Material}} +$$
$$\text{Ambient}_{\text{LightModel}} * \text{Ambient}_{\text{Material}} + \sum_{AllLights} \left[ \left( \frac{i}{k_c + k_l d + k_q d^2} \right) * \right.$$
$$(1|0|\max\{v \cdot d, 0\}^{\text{Spotlight\_Exponent}_{\text{Light}}}) * [\text{Ambient}_{\text{Light}} *$$
$$\text{Ambient}_{\text{Material}} + \text{Diffuse}_{\text{Light}} * \text{Diffuse}_{\text{Material}} * (1|0|\max\{l \cdot n, 0\}) +$$
$$\left. \text{Specular}_{\text{Light}} * \text{Specular}_{\text{Material}} * (1|0|\max\{s \cdot n, 0\})^{\text{Shininess}_{\text{Material}}} \right]$$

where with reference to FIG. 4:

$k_c$=OpenGL constant for Constant Attenuation $k_l$=OpenGL constant for Linear Attenuation $k_q$=OpenGL constant for Quadratic Attenuation d=abs distance (vertex to light position)

1|0|max=1 for presence of spotlight, diffuse light, or shiny material and 0 for absence {dot product, 0}=minimum vector value is 0 v=unit vector 50 (vertex to light position)

d=spotlight direction [normalized to have a unit vector of magnitude one]

l=unit vector 50 (light position to vertex)=−v n=unit vector 54 (vertex normal)

s=unit half-vector 52(1+unit(viewpoint to vertex))

All of the above data can be provided or calculated by the CPU 18 as would be obvious to those having ordinary skill in the art. Similarly, the design and programming of the pixel selection mechanism 22, the illumination calculation mechanism 24, and the interpolation mechanism 26 would be obvious to those having ordinary skill in the art. It is understood that the illumination calculation mechanism 24 may vary depending on the predetermined illumination calculation to be used in the graphic system and that the preferred mode uses the Phong illumination calculation.

In certain situations where a high degree of realism is desired, an operator may wish to override parts of the system 10 of the present invention and have every pixel within the object 28 subject to the Phong illumination calculations for the highest degree of realism or just the pixels up to sixteen pixels apart for the lowest quality for the highest rendering speed without being too obvious. It should be generally noted that it has heuristically been determined that having the calculations done at sixteen pixel increments (i.e., with every pixel separated from every other pixel by sixteen pixels), a rendered image is relatively poor, but this might be acceptable in certain scenes, such as those with little or no specular highlight. In order to maintain a reasonably realistic image, it has been determined that the Phong illumination calculation should not be performed on pixels that are further apart than eight pixels.

Keeping in mind that the number of calculations which must be performed are not only a function of the number of pixels, but also a function of the number of lights, it was realized that determining a direct relationship between the two might lead to optimal results in minimizing the number of calculations required while maximizing the quality. Further, it was realized that in a typical room or lighting situation, the number of lights likely to generate specular highlights was small.

Further, since OpenGL indicated that the minimum of lights which had to be considered for specular highlights is 8, the pixel selection mechanism 22 of FIG. 1 was developed in which Phong illumination calculations were performed on pixels which were spaced apart in proportion to the number of lights providing specular highlights. This means that for one light providing a specular highlight, every pixel would be subject to the Phong illumination calculation. This arrangement is shown in FIG. 5. For two lights, one pixel would be skipped between Phong illumination calculation pixels. For three lights, two pixels would be skipped. This pattern would be repeated up to eight lights as shown in FIG. 6.

An important note here is that in typical applications, lighting conditions change from frame to frame. In one frame, the scene may be relatively dark, that is, with few lights, but in the next frame more lights may be turned on, suddenly requiring more calculations in order to render the scene. Furthermore, the properties of existing lights may also change from scene to scene, causing a corresponding increase/decrease in terms of the number of computations required to render the scene. The adaptive interpolation, with both its pixel selection linked to the number of lights, as well as operator (programmed) specified override depending on the lighting conditions, enables an optimal choice to be made between the rendering speed and quality at each frame.

To fill in the pixels in between the Phong illumination calculation pixels, it is desirable to interpolate their specular highlight appearance. Several different attenuation equations were tested to provide realistic images. In FIG. 7 is shown a linear attenuation with pixel 64 being the Phong illumination calculated pixel and each of the successive pixels to pixel 66 being linearly attenuated. At the same time, interpolation is inhibited from samples beyond the edge of the object.

In FIG. 8, is shown an attenuation with pixel 72 being the Phong illumination calculated pixel and each of the successive pixels to pixel 76 being quadratically attenuated. Again, interpolation is inhibited from samples beyond the edge of the object.

In FIG. 9 is shown an attenuation with pixel 82 being the Phong illumination calculated pixel, which is the brightest, and each of the successive pixels to pixel 84 being cubically less bright. Again, interpolation is inhibited from samples beyond the edge of the object.

While the invention has been described in conjunction with specific best modes, it is to be understood that many alternatives, modifications, and variations will be apparent to those skilled in the art in light of the aforegoing description. Accordingly, it is intended to embrace all such alternatives, modifications, and variations which fall within the spirit and scope of the appended claims. All matters set forth herein or shown in the accompanying drawings are to be interpreted in an illustrative and non-limiting sense.

What is claimed is:

1. An apparatus for displaying an image of an object illuminated by at least one light on a display in a computer graphics system having a central processing unit containing lighting condition and object data wherein the object is graphically represented by a frame of polygons in which each of the polygons has a surface defined by a set of vertices and the surface contains a plurality of pixels, the apparatus comprising:

an input for receiving the object data from the central processing unit, the object data containing the number of lights illuminating the object;

a calculating mechanism for subjecting individual pixels to a predetermined illumination calculation;

a pixel selection mechanism adjustively responsive to the lighting condition data to select, in proportion to the number of lights, the pixels located at and between the set of vertices to be subject to said predetermined illumination calculation; and an output to provide the results of the illumination by the at least one light on the object.

2. The apparatus as claimed in claim 1 including an interpolation mechanism for interpolating the results of the illumination by the at least one light on the object on pixels disposed between the pixels subject to said predetermined illumination calculation.

3. The apparatus as claimed in claim 1 including an adjustment mechanism to adjust the pixels subject to said predetermined illumination calculation.

4. The apparatus as claimed in claim 1 wherein said pixels subject to said predetermined illumination calculations are spaced apart and the distance between said pixels subject to said predetermined illumination calculations is directly related to the lighting condition data.

5. The apparatus as claimed in claim 1 including an overriding mechanism for adaptably overriding said pixel selection mechanism selectively based on the number of lights and the lighting condition data.

6. The apparatus as claimed in claim 1 including an interpolation mechanism for interpolating the illumination between pixels subject to said predetermined illumination calculations, said interpolation mechanism interpolates between the pixels subject to said predetermined illumination calculations within said polygon.

7. The apparatus as claimed in claim 1 including an interpolation mechanism which inhibits interpolation of pixels from samples beyond the edges of the object.

8. An apparatus for displaying an image of an object illuminated by at least one light on a display in a computer graphics system having a central processing unit containing lighting condition and object data wherein the object is graphically represented by a frame of polygons in which each of the polygons has a surface defined by a set of vertices and the surface contains a plurality of pixels, the apparatus comprising:

an input for receiving the object data from the central processing unit, the object data containing the number of lights illuminating the object;

a calculating mechanism for subjecting individual pixels to a Phong illumination calculation;

a pixel selection mechanism adjustively responsive to the lighting condition data to select, in proportion to the number of lights, the pixels located at and between the set of vertices to be subject to said Phong illumination calculation at predetermined pixel separations; and an output to provide the results of the illumination by the at least one light on the object.

9. The apparatus as claimed in claim 8 including an interpolation mechanism for interpolating the results of the illumination by the lights on the object on pixels disposed between the pixels subject to said Phong illumination calculations.

10. The apparatus as claimed in claim 8 including an interpolation mechanism for interpolating the results of the illumination by the at least one light on the object on pixels disposed between the pixels subject to said Phong illumination calculation.

11. The apparatus as claimed in claim 8 including an adjustment mechanism to adjust the pixels subject to said Phong illumination calculation.

12. The apparatus as claimed in claim 8 including an overriding mechanism to override said responsiveness of said pixel selection mechanism to respond to the lighting condition data and to independently adjust the pixels subject to said Phong illumination calculation.

13. The apparatus as claimed in claim 8 wherein said pixels subject to said Phong illumination calculations are spaced apart and the distance between said pixels subject to said Phong illumination calculations is optimized for speed and quality.

14. The apparatus as claimed in claim 8 including an overriding mechanism for adaptably overriding said pixel selection mechanism selectively based on the number of lights and the lighting condition data.

15. The apparatus as claimed in claim 8 including an interpolation mechanism for interpolating the illumination between pixels subject to said Phong illumination calculations, said interpolation mechanism interpolates between the pixels subject to said Phong illumination calculations within said polygon.

16. The apparatus as claimed in claim 8 including an interpolation mechanism which inhibits interpolation of pixels from samples beyond the edges of the object.

17. A method for displaying an image of an object illuminated by the at least one light on a display in a computer graphics system having a central processing unit containing lighting condition and object data wherein the object is graphically represented by a frame of polygons in which each of the polygons has a surface defined by a set of vertices and the surface contains a plurality of pixels, the method comprising the steps of:

receiving the object data from the central processing unit, the object data containing the number of lights illuminating the object;

calculating Phong illumination calculations for individual pixels;

adjustively selecting, in proportion to the number of lights, pixels located at and between the set of vertices to be subject to said Phong illumination in response to the lighting condition data; and providing the results of the illumination by the at least one light on the object.

18. The method as claimed in claim 17 including interpolating the results of the illumination by the at least one light on the object on pixels disposed between the pixels subject to the Phong illumination calculation.

19. The method as claimed in claim 17 including adjusting the pixels subject to said Phong illumination calculation.

20. The method as claimed in claim 17 wherein said pixels subject to said Phong illumination calculations are spaced apart and the distance between said pixels subject to said Phong illumination calculations is directly related to the lighting condition data.

* * * * *